United States Patent [19]

Moore et al.

[11] Patent Number: 4,904,730
[45] Date of Patent: Feb. 27, 1990

[54] RUBBER-MODIFIED RESIN BLENDS

[75] Inventors: Eugene R. Moore; Thomas D. Traugott, both of Midland, Mich.

[73] Assignee: The Dow Chemical Company, Midland, Mich.

[21] Appl. No.: 361,813

[22] Filed: May 30, 1989

Related U.S. Application Data

[63] Continuation of Ser. No. 179,445, Apr. 8, 1988, abandoned.

[51] Int. Cl.[4] .............................................. C08L 51/00
[52] U.S. Cl. ...................................... 525/75; 525/76; 525/80; 525/83
[58] Field of Search ...................... 525/83, 75, 76, 80

[56] References Cited

U.S. PATENT DOCUMENTS

| | | |
|---|---|---|
| 2,755,270 | 7/1956 | Hayes .................................... 525/83 |
| 3,030,346 | 4/1962 | Cooper . |
| 3,031,432 | 4/1962 | Kern . |
| 3,041,312 | 6/1962 | Boyd . |
| 3,268,501 | 8/1966 | Crouch et al. . |
| 3,300,545 | 1/1967 | Baer . |
| 3,402,160 | 9/1968 | Hayes . |
| 3,488,332 | 1/1970 | Hiraoka . |
| 3,600,467 | 8/1971 | Darcy et al. . |
| 3,639,511 | 2/1972 | Kreibich . |
| 3,786,116 | 1/1974 | Milkovich et al. . |
| 3,812,088 | 5/1974 | Bennett . |
| 3,842,050 | 10/1974 | Milkovich et al. . |
| 3,842,057 | 10/1974 | Milkovich et al. . |
| 3,842,058 | 10/1974 | Milkovich et al. . |
| 3,842,059 | 10/1974 | Milkovich et al. . |
| 3,846,393 | 11/1974 | Milkovich et al. . |
| 3,849,518 | 11/1974 | Severini et al. . |
| 3,862,098 | 1/1975 | Milkovich et al. . |
| 3,862,101 | 1/1975 | Milkovich et al. . |
| 3,862,102 | 1/1975 | Milkovich et al. . |
| 3,870,769 | 3/1975 | Yoshida et al. . |
| 4,012,462 | 3/1977 | Chaudhary . |
| 4,163,032 | 7/1979 | Liebig et al. . |
| 4,256,853 | 3/1981 | Naylor et al. . |
| 4,639,473 | 1/1987 | Wingler et al. . |
| 4,645,796 | 2/1987 | Beyer et al. . |

FOREIGN PATENT DOCUMENTS

| | | |
|---|---|---|
| 0087165 | 6/1983 | European Pat. Off. . |
| 0186785 | 7/1986 | European Pat. Off. .............. 525/75 |

OTHER PUBLICATIONS

Journal of the American Chemical Society, vol. 78, para. 2656 (1956) by M. Szwarc et al.
Article entitled "The Effect of Molecular Weight Distribution on the Physical Properties of Polystyrene", McCormick et al., *Journal of Polymer Science*, vol. XXXIX, pp. 87–100 (1959).
Article by Wyman et al. entitled "Comparison of Some Mechanical and Flow Properties of Linear and Tetrachain Branched 'Monodisperse' Polystyrenes", published in the Journal of Polymer Science: Part A, vol. 3, pp. 681–696 (1965).
Article by Von Alfred Hauss entitled "Eigenschaftskennfunktionen Thermisch Hergestellt Polystyrole Unterschiedlichen Molekulargewicht Und Unterschiedlicher Molekulargewichtaverteilu", published May 16, 1969.
Publication entitled "Carbanions, Living Polymers and Electron Transfer Processes" by M. Szwark, pp. 27–37, published by Interscience in 1968.
J. C. Moore, "Gel Permeation Chromatography. I. A New Method for Molecular Weight Distribution of High Polymers", *Journal of Polymer Science: Part A*, vol. 2, pp. 835–843 (1964).
Japan J57070134-A Abstract (1982).
Japan J61197645-A Abstract (1986).
Kamienski, "Lithium Catalysis in Industrial Polymerization", *Industrial and Engineering Chemistry*, vol. 57, No. 1, Jan. 1965, pp. 38–55.

*Primary Examiner*—Jacob Ziegler
*Attorney, Agent, or Firm*—Price, Heneveld, Cooper, DeWitt & Litton

[57] ABSTRACT

An impact resistant polymeric composition and a process for its production. The composition comprises a rigid polymeric matrix comprising an anionically polymerized copolymer of at least one isopropenyl aromatic monomer and at least one vinyl aromatic monomer, said matrix having dispersed therein an elastomeric phase comprising at least one moderately cross-linked ungrafted rubber and at least one moderately cross-linked lightly-grafted rubber, wherein the lightly-grafted rubber has a graft-to-rubber ratio of 0.9:1 or less. The elastomeric phase is melt agglomerated to provide aggregates having particle sizes in the range from 3,000 to 100,000.

20 Claims, No Drawings

RUBBER-MODIFIED RESIN BLENDS

This is a continuation of application Ser. No. 179,445, filed Apr. 8, 1988, now abandoned.

BACKGROUND OF THE INVENTION

The present invention relates to blends of rubber-modified copolymers of isopropenyl aromatic monomers such as alpha-methylstyrene and vinyl aromatic monomers such as styrene.

Impact resistant polymeric compositions are well known in the prior art. Particularly well known are those impact resistant polymeric compositions comprising a rubber-reinforcing polymer dispersed in a rigid phase polymeric composition. Exemplary of such impact resistant polymers are those containing styrene acrylonitrile and a reinforcing rubber. These impact resistant compositions comprising styrene acrylonitrile and a reinforcing rubber are known in the art as ABS or ABS-type compositions.

These impact resistant compositions can be prepared in a variety of ways. One method of preparation is to polymerize styrene and acrylonitrile in the presence of rubber, for example, by a mass or bulk polymerization process, to obtain a rubber-reinforced styrene/acrylonitrile resin. Alternatively, said polymers can be produced by blending heat-plasticized grafted reinforcing rubber with heat-plasticized styrene acrylonitrile resins.

While the incorporation of rubber-reinforcing polymers into nonrubber-containing polymer compositions is generally effective to improve impact strength, it is quite often accompanied by a reduction in other properties, such as heat distortion temperature. Thus, it would be advantageous if rubber-modified polymeric compositions were available which exhibited not only desired levels of impact resistance but at the same time displayed desirably high heat distortion values with lesser negative effect on other properties, such as gloss, thermal stability and hardness.

SUMMARY OF THE INVENTION

The present invention provides a blended composition comprising a matrix comprising at least one anionically polymerized random copolymer of at least one isopropenyl aromatic monomer and at least one vinyl aromatic monomer said matrix having dispersed therein an elastomeric phase comprising a melt-agglomerated blend of at least ungrafted rubber having a swell index in the range from 5 to 25 and at least one lightly-grafted rubber, wherein the lightly-grafted rubber has a graft-to-rubber ratio of 0.9:1 or less and a swell index in the range from 5 to 25. Such compositions exhibit good impact strength with high heat distortion values and lesser negative effect on gloss, thermal stability and hardness.

DESCRIPTION OF THE PREFERRED EMBODIMENTS

In the preferred embodiment, the copolymers which form the matrix continuous phase are prepared by the anionic polymerization of at least one isopropenyl aromatic monomer having the formula:

$$CH_2=C(CH_3) Ar$$

and at least one vinyl aromatic monomer having the formula:

$$CH_2=CH-Ar$$

wherein Ar is an aromatic radical (including various alkyl and halo-ring-substituted aromatic units) of from 6 to 10 carbon atoms. The preferred isopropenyl aromatic monomer is alpha-methylstyrene although other monomers such as isopropenyltoluene and isopropenylnaphthalene can also be used. Mixtures of isopropenyl aromatic monomers can be employed, and it is preferred that alpha-methylstyrene be at least one monomer in such mixtures. Styrene is currently preferred as the vinyl aromatic monomer. Vinyl aromatic monomers other than styrene that can be employed include vinyl toluene, vinyl naphthalene, t-butylstyrene, the several chlorostyrenes such as the mono- and di-chlorostyrenes, the several bromostyrenes such as the mono- and dibromo-styrenes, and the like. Mixtures of such vinyl aromatic monomers can be employed with any one or more of the isopropenyl aromatic monomers in the preparation of the copolymer matrix resin.

The invention formulations perform well when the copolymers contain between 25 and 70 weight percent, preferably 30 to 60 weight percent, of isopropenyl aromatic monomer. The heat distortion characteristics are substantially improved as the proportion of isopropenyl aromatic monomer in the copolymer is increased, particularly when alpha-methylstyrene is the isopropenyl aromatic monomer and especially when the copolymer is comprised substantially of alpha-methylstyrene and styrene.

The anionically polymerized copolymers desirably have a weight average molecular weight of at least 50,000, preferably in the range of 50,000 to 500,000 and most preferably in the range from 100,000 to 200,000; a molecular weight distribution (weight average molecular weight divided by number average molecular weight), absolutely not greater than 2.3., preferably not greater than 1.8, more preferably not greater than 1.5 and most preferably in the range from 1.0 to 1.3. In a second particularly preferred embodiment, the copolymers have a total dimer and trimer content less than 1,000 parts per million and a residual monomer level less than 200 parts per million. In a particularly preferred embodiment, at least 80 percent by weight of the anionically polymerized copolymer will have a molecular weight which is ±30 percent times the weight average molecular weight of the anionically polymerized copolymer. Blends of separately prepared copolymers as described above can be employed in the invention.

Processes for anionic polymerization of isopropenyl aromatic and vinyl aromatic monomers are typically not employed for commercially producing copolymers such as are described herein. In the broadest sense, the polymerization to obtain copolymers suitable for use in the present invention comprises mixing a solution of an anionic catalyst into a solution of a mixture of isopropenyl aromatic and vinyl aromatic monomers, initiating the polymerization reaction and permitting it to proceed to completion, i.e., complete reaction of the polymerizable monomer feedstock.

Substantially any anionic catalyst capable of initiating polymerization of isopropenyl aromatic and vinyl aromatic monomers can be employed in making copolymers for use in the invention. Such catalysts are already known to the art and usually comprise ion-radical adducts and alkaline metal salts of very weak acids. The ion-radical adducts are 1:1 adducts of an alkaline metal such as lithium, sodium, potassium, rubidium or cesium, and an organic compound capable of forming a ion-radical adduct therewith, such as aliphatic hydrocarbons, polycycloaromatic hydrocarbons and alkyl derivatives thereof, including naphthalene, methylnaphthalene, anthracene, phenanthrene and the like; and aromatic ketones, including benzophenone and acetophenone.

The catalysts are sometimes used in the form of solutions containing at least 20 percent by weight of an inert polar solvent, based on the weight of the catalyst for ease of operation and conducting the polymerization. Suitable solvents include cyclohexane 1,2-dimethoxyethane, 1,2-dithioloxyethane, tetrahydrofluoran, dioxane, dioxalane, carbitol ethers, Cellosolve ethers, aliphatic ethers such as dimethyl ether and diethyl ether, cycloaliphatic ethers such as methoxycyclohexane and aromatic ethers such as diphenyl ether.

The solvents in which the isopropenyl aromatic and vinyl aromatic monomers can be dissolved to form the monomer solutions are inert organic solvents such as the polar solvents previously mentioned for the catalyst and nonpolar solvents such as aromatic hydrocarbons and alkyl derivatives thereof, including benzene, toluene, xylenes, ethyl benzene, biphenyl and the like; cycloaliphatic hydrocarbons and alkyl derivatives thereof, including cyclohexane and methyl cyclohexane; saturated aliphatic hydrocarbons containing from 2 to 30 carbon atoms such as butane, pentane, hexane, octane, decane and octadecane; and aliphatic olefins which are nonpolymerizable in the system such as propene and butene.

The anionic polymerization of the isopropenyl aromatic and vinyl aromatic monomers is preferably accomplished in an inert atmosphere. A very pure monomer feedstock substantially free of water, oxygen, carbon dioxide, Lewis acids and other impurities is required. Accordingly, the monomer feedstock (which can be diluted in solvent) is heated and sprayed into a vacuum chamber or dry nitrogen is bubbled through the feedstock solution to remove carbon dioxide, oxygen and water. The thus treated feedstock is passed over an activated alumina bed and then passed to a hydrogenation unit where any phenyl acetylene in the feedstock is reduced to styrene monomer.

The purified monomer feedstock, diluted with a suitable solvent such as ethyl benzene, is cooled to a temperature below 25° C., preferably below 20° C., and charged to a clean oxygen-free reaction zone which is at a temperature below 25° C., preferably below 20° C. The monomer-solvent solution typically contains from 20 to 60, and preferably 20 to 35, percent monomer. With the entire monomer charge in the reaction zone, the initiator or catalyst system, for example, 15 percent solution of n-butyl lithium in cyclohexane, is introduced. The temperature of the reaction zone is maintained below 25° C. during the addition of the initiator. This enables the initiator to react with any impurities such as water, oxygen, oxides and the like in the system without simultaneously initiating the polymerization of the isopropenyl aromatic and vinyl aromatic monomers and insures more uniform polymerization of these monomers. The initiator is uniformly dispersed throughout the cooled monome feedstock and substantially instantaneously reacts with impurities which may be present. Once addition and dispersion of initiator solution is completed and the initiator has had a opportunity to react with any impurities, the temperature of the reaction zone is raised above 25° C., preferably to a temperature in the range of 35° to 45° C. Propagation begins and the polymerization reaction proceeds exothermically. Upon completion of the polymerization reaction, a reaction terminator, such as methanol, is added to the polymer-solvent mixture and the mixture is devolatilized.

The anionic polymerization of the isopropenyl aromatic and vinyl aromatic monomers has been found to result in lower amounts of residual monomers and low molecular weight impurities in comparison to current commercial nonanionic processes. Production control of the anionic polymerization should be maintained s as to keep the inherent advantages of the anionic polymerization to give a low quantity of residual monomers and residual low molecular weight impurities in the copolymer product. The total dimer and trimer content should be less than 1,000 parts per million and preferably less than 300 parts per million. This compares with the typical prior art copolymers which have residual dimers and trimers of 3,000 to 15,000 parts per million. The residual monomer level should be less than 200 parts per million and preferably less than 100 parts per million, in comparison to typical prior art commercial copolymers having 300 to 800 parts per million residual monomers.

Initially, the reaction mixture prior to polymerization usually contains about 10 to 55 percent by weight of mixed monomer charge, based on the total weight of solvent and the monomer solution and the weight of solvent in the catalyst solution. The amount of catalyst employed is dependent upon the molecular weight desired for the product, the average molecular weight of the copolymers being proportional to the reciprocal of the catalyst concentration. The reaction can also be carried out in a continuous process, in which all of the above reactants are charged continuously to a well stirred reactor. Generally, the continuous process produces a broader distribution and requires a plug flow reactor to lower residue monomer, yet consumes less initiator.

As the nongrafted rubbery polymer which forms one part of the elastomeric discontinuous phase of the invention, there can be employed substantially any elastomeric material having a swell index in the range from 5 to 25, preferably 10 to 25. As is generally known, swell index is indicative of the degree of cross-linking, with the crosslinking density increasing with decreasing swell index. Too high a cross-link density (low swell index) results in a loss of physical property such as reduced toughness, while too low a cross-link density (high swell index) can result in an unstable rubbery polymer and an accompanying degradation in physical properties. It has been found that a lightly cross-linked rubbery polymer having the recited swell index range provides reproducible desirable product qualities.

With respect to this invention, a "rubbery polymer" is a polymer having a glass transition temperature not higher than 0° C., preferably not higher than −20° C., as determined by ASTM Test D-746-52T. Suitable rubbery polymers include diene rubbers, ethylene propylene rubbers, ethylene propylene diene (EPDM) rubbers, acrylate rubbers, polyisoprene, halogen-containing rubbers and mixtures thereof. Also suitable are copolymers of elastomeric material-forming monomers with other copolymerizable monomers. The preferred nongrafted lightly cross-linked rubbers include homopolymers and copolymers of conjugated 1,3-dienes such as butadiene, isoprene, piperylene and chloroprene with up to an equal amount by weight of one or more copolymerizable monoethylenically unsaturated monomers, including isopropenyl aromatic and vinyl aromatic monomers as previously described and including unsaturated nitriles, such as acrylonitrile and methacrylonitrile. Suitable monoethylenically unsaturated monomers include styrene, p-vinyl toluene, 2,4-dimethylstyrene, ethylstyrene, p-t-butylstyrene, alpha-methylstyrene, alpha-ethylstyrene, alpha-methyl-p-methylstyrene, vinyl naphthalene, p-chlorostyrene, 2,4-dibromostyrene, methyl methacrylate, ethyl acrylate, acrylamide, methacrylamide, N-butyl acrylamide, methyl vinyl ketone, methyl isopropenyl ketone, ethylene, propylene, pyridene, vinyl acetate, vinyl chloride and vinylidene chloride.

The most preferred nongrafted rubbery polymers are those containing from 70 to 100 percent by weight of butadiene and/or isoprene and up to 30 percent by weight of an isopropenyl aromatic monomer, vinyl aromatic monomers and unsaturated nitrile monomers. Exemplary of such a preferred nongrafted rubbery polymer is one comprising a copolymer of 90 to 97 percent by weight butadiene and 3 to 10 percent by weight of styrene and optionally from 1 to 3 percent by weight of acrylonitrile.

The nongrafted, lightly cross-linked rubbery polymers are well known. The rubbery polymers can be prepared by any of the known techniques of polymerization including the bulk polymerization, solution polymerization and emulsion or suspension polymerization techniques by batch, continuous or intermittent addition of the monomers and other components. The preferred synthesis method is emulsion polymerization. Typically, the nongrafted cross-linked rubbery polymer particles will initially have diameters ranging in size from about 300 to about 10,000 preferably from about 600 to about 4,000, most preferably from about 800 to about 2,000 angstroms, these values being number average values.

The lightly-grafted cross-linked rubber reinforcing particles which, in combination with the nongrafted rubber reinforcing particles previously described, form the elastomeric discontinuous phase of the invention blends comprise a graftable rubber substrate having a swell index in the range from 5 to 25, preferably 10 to 20, said substrate having grafted thereon and/or thereto a superstrate of copolymer.

Substantially any of the previously described materials which are employed in forming the nongrafted rubber particles previously described can be employed in forming graftable rubber substrates for the lightly-grafted rubber reinforcing particles. As with the nongrafted rubbers, the most preferred graftable rubber substrates are those consisting essentially of 70 to 100 percent by weight of butadiene and/or isoprene and up to 30 percent by weight of an isopropenyl aromatic hydrocarbon such as alphamethylstyrene, a vinyl aromatic hydrocarbon such as styrene, and an unsaturated nitrile such as acrylonitrile. Exemplary of such a preferred graftable rubber substrate is one comprising a copolymer of 90 to 97 percent by weight butadiene and 3 to 10 percent by weight of styrene and/or acrylonitrile, with the acrylonitrile, when used in combination with styrene, being present in an amount roughly one-third that of the styrene component.

The graftable rubber substrate is preferably prepared through an emulsion polymerization process. Polymerization of the monomers present in the aqueous suspension is effected in substantially the same manner as that employed for producing nongrafted rubbery polymers. The graftable rubber substrate is subjected to a graft polymerization step wherein a superstrate of a copolymer is grafted on and/or to the graftable rubber substrate. The copolymer graft to the graftable rubber substrate is polymerized from a monomer mixture comprising a monoethylenically unsaturated monomer or mixture of two or more monomers which are copolymerizable with each other. The monoethylenically unsaturated monomer suitable for graft polymerization to the graftable rubber substrates are the same as those previously described as being suitable for forming the nongrafted rubber. Particularly preferred monomers are styrene or styrene and acrylonitrile. It is especially preferred that monomers which are used to form the matrix copolymer be employed to form the cross-linked lightly-grafted rubber reinforcing particles.

The graftable rubber substrates are grafted by techniques well known in the art. Preferred are techniques which favor the formation of a rigid thermoplastic polymer shell around the graftable rubber substrate rather than discrete particles of copolymers separate from the graftable rubber substrates.

The graft polymerization in which the copolymer is grafted to the graftable rubber substrate is allowed to continue until achieving a graft-to-rubber ratio (G/R) of from 0.1:1 to about 0.9:1. Preferably, the graft-to-rubber ratio is from about 0.1:1 to about 0.5:1. The graft polymerization product typically has a relatively small particle size with diameters from about 300 to about 15,000, preferably from about 600 to about 4,000, and most preferably from about 800 to about 2,000 angstroms.

As is known, the graft-to-rubber ratio (G/R) is the ratio of polymer grafted to the graftable rubber substrate (G) to the weight of the graftable rubber substrate to which the polymer is grafted (R). Methods for determining the G/R values for grafted rubbers are well known in the art. For example, ungrafted polymeric material can be separated from the graftable rubber substrates and the grafted rubber by solvent extraction using an appropriate solvent system such as a solution comprising two parts by volume acetonitrile and one part by volume dimethyl formamide. After solvent extraction, the remaining gel represents the graftable rubber substrates plus polymer grafted thereto. By knowing the percentage of graftable rubber substrates in the starting sample and the weight of the starting sample, the G/R value can be determined. The exact procedure used to determine the graft-to-rubber ratio is explained in greater detail in the examples of the present application.

The nonrubbery polymeric component, including the matrix copolymers, is present in the blends of the invention in an amount from 40 to 99 weight percent, preferably from 70 to 90 weight percent, most preferably 75 to 85 weight percent, based on the total weight of the blend composition. The lightly-grafted rubber particles and the nongrafted rubber particles are present in the invention blends in an amount such that the compositions have a rubber content of from 1 to 60 weight percent, preferably from 10 to 30 weight percent, most preferably 15 to 25 weight percent, based on total weight of the blend composition. The percentage of rubber which is provided by the lightly-grafted rubber particles is a function of the graft-to-rubber ratio G/R. It has been observed that a increase in G/R can result in a decrease in melt flow rate, reduced gloss and environmental stress crack resistance, while heat distortion and impact resistance values are improved at lower G/R ratios. Accordingly, as the G/R increases, the amount of graft rubber in the blends should be decreased while increasing the amount of ungrafted rubber present, while maintaining total rubber content within the ranges previously set forth. Conversely, at lower G/R levels, it may be advantageous to increase the amount o grafted rubber while decreasing the amount of ungrafted rubber to obtain optimum performance. The actual combining relationship of grafted rubber and ungrafted rubber in any particular G/R level is readily determined by preparing and evaluating a series of blends to obtain the blend which provides the desired performance qualities. Currently, it is preferred that the lightly-grafted rubber comprise from 10 to 90, preferably 10 to 50, most preferably 30 to 50, weight percent of total rubber blend.

Generally, it is preferred that the rubber reinforcing particles resent in the blends of the present invention have a broad particle size distribution. That is, some of the lightly-grafted and nongrafted rubber reinforcing particles have a relatively small particle diameter while some of the particles have a relatively large particle diameter. This broad particle size distribution has been found to product blend compositions having desirable physical properties.

The broad particle size distribution of the rubber reinforcing particles is achieved through a process of melt agglomeration. For the purposes of this invention, the term "melt agglomeration" refers to a process in which the rubber reinforcing particles having a relatively small particle diameter are subjected to mechanical shear while in a heat plastified state which causes the particles to agglomerate into stable particles having a relatively large particle diameter. Additionally, the process of melt agglomeration often causes a portion of the rubber-reinforcing particles to form chains of interconnecting particles. In some cases, the chains of interconnecting particles form net-like structures of interconnected particle chains. This mechanical shearing while in a heat plastified state is efficiently and economically performed in a conventional melt processing step, such as extrusion or roll milling.

The emulsions, preferably in the form of latexes, of ungrafted rubber and lightly-grafted rubber are blended in a manner so as to be well mixed. This can be accomplished in any conventional manner by combining the latexes in a conventional mixing apparatus. The mixture of latexes is then coagulated using any conventional means, for example, by freeze coagulation, chemical coagulation or by shear coagulation and mechanical dewatering. Preferably, latex solids are recovered by freeze coagulation process. If the coagulant is stringy or rubbery, the latexes can be diluted before coagulation o the coagulant can be shredded for easier handling.

The recovered latex solids are then melt agglomerated in the presence of, and simultaneously melt blended with, the anionically polymerized copolymer. This step can be carried out, for example, by extrusion or roll milling with heating. Suitable apparatus for carrying out this step is well known in the art for compounding plastics and includes, for example, double screw extruders or single screw extruders. The melt agglomeration combines the small particle diameter grafted and ungrafted rubber particles into aggregates having particle sizes in the range from 3,000 to 100,000, preferably 6,000 to 40,000, and preferably 2,000 to 20,000 angstroms.

The following example is given to illustrate the preferred embodiment of the invention without limiting it.

EXAMPLE 1

Preparation of Moderately Cross-Linked, Lightly Grafted Rubber

Into an agitated reactor is charged 2,790 grams of a butadiene/styrene/acrylonitrile (93/5/2) rubber latex (37.4 percent solids) having a mean particle diameter of 1,100 angstroms, a gel content of 88.7 percent and a swell index of 16.2. The rubber latex is heated to 70° C. under a nitrogen atmosphere. To the rubber latex an aqueous feed and a monomer feed are added continuously. The aqueous feed comprised 1 gram sodium persulfate, 10.6 grams of sodium alkyl aryl sulfonate dispersing agent and 198.3 grams deionized water. The monomer feed comprised 0.25 grams of n-dodecyl mercaptan and 502 grams of styrene. The aqueous and monomer feeds are added over 180 minutes. After the addition of the aqueous feed stream and the monomer feed stream is complete, the reaction is continued at 70° C. for 1 hour. At this time, a small amount of antifoam agent is added to the latex and the latex is steam stripped to remove the residual monomers. One liter of condensate is collected with about 20 milliliters of unreacted styrene. Solids after stripping is 33.6 percent.

EXAMPLE 2

Preparation of Blend of Ungrafted Rubber Latex and Grafted Rubber Latex 1,002 grams of the styrene/butadiene/acrylonitrile emulsion latex which was employed in Example 1 to form the graft rubber latex of the example is thoroughly mixed with 1,632 grams of the grafted latex from Example 1 with 4.5 grams of 1,1,3-tris(2'-methyl-4'-hydroxy-5'-t-butyl phenyl) butane and 1.5 grams of dilauryl-thiodipropionate oxidative stabilizers. The mixture is freeze coagulated, thawed, centrifuged and dried overnight at 50° C. In the rubber mixture, each latex provided one-half of the total rubber content.

EXAMPLE 3

Melt Agglomeration of Grafted Rubber-Ungrafted Rubber Mixture In the Presence of Anionically Polymerized Alpha-methylstyrene/Styrene Copolymer A 50:50 weight ratio copolymer of alpha-methylstyrene and styrene is made by means of continuous anionic polymerization so as to have a 195,000 $M_w$ and a $M_w/M_n$ of 2.2. 2884.1 grams of the anionically polymerized copolymer are dried mixed with 941.1 grams of the grafted rubber/ungrafted rubber mixture from Example 2. The mixture is fed to a Baker Perkins MP mixer compounding line. The compounding section is operated at 400 rpm and the extruder is run at 110 rpm. The melt temperatures are 203°, 207°, 203° and 211° C. in zone 1, zone 2, the extruder and the die, respectively. The compounding line is fed at a rate of about 20 pounds per hour of polymer-rubber blend.

The pelletized blend is injection molded on a Negri Bossi machine at the following conditions:

| | |
|---|---|
| Zone 1 Temperature | 450° F. |
| Zone 2 Temperature | 475° F. |
| Mold Temperature | 150° F. |

-continued

| Injection Pressure | 800 psi |
|---|---|
| Hold Pressure | 600 psi |
| Injection Time | 6 seconds |
| Cycle Time | 30 seconds |

The bars are tested according to ASTM standard.

EXAMPLE 4

Chemically Agglomerated Mixture of Grafted Rubber Compounded with Anionically Polymerized Alpha-Methyl Styrene/Styrene Copolymer A 50:50 weight ratio copolymer of alpha-methylstyrene/styrene is made by means of continuous anionic polymerization so as to have a 195,000 weight average molecular weight and a molecular weight distribution of 2.2. To this copolymer is added an agglomerated latex made by chemically agglomerating a monodisperse (1100 angstrom average particle size) butadiene/styrene latex with an agglomerating agent described in U.S. Pat. No. 4,419,496. The chemically agglomerated latex is then grafted with polystyrene and finished by freeze coagulation. The grafted rubber is compounded, pelletized and molded in accordance with the procedure of Example 3.

EXAMPLE 5

A sample is prepared in a manner similar to that of Example 3 except that a batch technique is used to prepare the 50:50 weight ratio copolymer of alpha-methyl styrene and styrene. The $M_w$ is maintained at 195,000, but the $M_w/M_n$ ratio is reduced to 1.1. The oligomer level is 1850 ppm and residual monomer total 150 ppm. As in Example 3, the above is compounded with the rubber mixture of Example 2 and tested.

EXAMPLE 6

Comparative Data

Physical property tests of specimens of the Example 3, 4 and 5 formulations, as well as test specimens of anionically polymerized alpha-methyl styrene copolymer containing no rubbery polymer are as follows:

| Sample | Percent Rubber | $T_y$(psi) | Izod (ft.lbs. per inch) | Vicat Heat Distortion (°F.) |
|---|---|---|---|---|
| Ex. 5 | 20 | 5900 | 4.1 | 274 |
| Ex. 4 | 20 | 4740 | 3.5 | 260 |
| Ex. 3 | 20 | 4950 | 3.4 | 274 |
| Control | 0 | 9030 | 0.15 | 279 |

As can be seen from the comparative data, the use of a melt agglomerated latex prepared in accordance with the present invention provides a significant improvement in heat distortion temperature in comparison to the use of a chemically agglomerated elastomer latex.

It is understood that the above is merely a preferred embodiment and that various changes and alterations can be made without departing from the spirit and broader aspects of the invention.

The embodiments of the invention in which an exclusive property or privilege is claimed are defined as follows.

1. A blended composition comprising:
   a rigid matrix continuous phase comprising at least one anionically polymerized copolymer of at least one isopropenyl aromatic monomer and at least one vinyl aromatic monomer; and
   an elastomeric discontinuous phase dispersed in said matrix phase comprising a melt-agglomerated mixture of at least one cross-linked ungrafted rubber and at least one cross-linked lightly-grafted rubber.

2. A blend composition in accordance with claim 1 wherein said anionically polymerized copolymer has a weight average molecular weight of at least 50,000 and a molecular weight distribution not greater than 2.3; wherein each of said ungrafted rubber and said lightly-grafted rubber have a swell index in the range from 5 to 30; and wherein said lightly-grafted rubber has a G/R in the range from 0.1 to 0.9 and the amount of said lightly-grafted rubber is in the range from 10 to 90 weight percent, based on total rubber content of said discontinuous phase.

3. A blend composition in accordance with claim 2 wherein said molecular weight distribution is not greater than 1.8.

4. A blend composition in accordance with claim 1 wherein the amount of said matrix continuous phase is in the range from about 60 to 99 weight percent and the amount of said elastomeric discontinuous phase is such that the composition has a rubber content in the range from 1 to 40 weight percent.

5. A blend composition in accordance with claim 4 wherein said anionically polymerized copolymer has a weight average molecular weight of at least 50,000 and a molecular weight distribution not greater than 2.3; each of said cross-linked ungrafted rubber and said cross-linked lightly-grafted rubber has a swell index in the range from 5 to 30; said lightly-grafted rubber has a G/R in the range from 0.1 to 0.9 and the amount of said grafted rubber is in the range from 10 to 90 weight percent, based on total weight of rubber.

6. A blend composition in accordance with claim 5 wherein said molecular weight distribution is not greater than 1.8.

7. A blend composition in accordance with claim 1 wherein said elastomeric discontinuous phase comprises aggregates having particle sizes in the range from 3,000 to 100,000 angstroms.

8. A blend composition in accordance with claim 7 wherein said anionically polymerized copolymer has a weight average molecular weight of at least 50,000 and a molecular weight distribution not greater than 2.3; and wherein each of said ungrafted rubber and said grafted rubber has a swell index in the range from 5 to 30 and wherein said grafted rubber has a G/R in the range from 0.1 to 0.9 and the amount of said grafted rubber is in the range from 10 to 90 weight percent, based on total rubber weight.

9. A blend composition in accordance with claim 8 wherein said molecular weight distribution is not greater than 1.8.

10. A blend composition in accordance with claim 7 wherein the amount of said matrix continuous phase comprises from 60 to 99 weight percent and the amount of said ungrafted rubber and said lightly-grafted rubber is such that the composition has a rubber content in the range from 1 to 40 weight percent.

11. A blend composition in accordance with claim 10 wherein said anionically polymerized copolymer has a weight average molecular weight of at least 50,000 and a molecular weight distribution not greater than 2.3; wherein each of said ungrafted and grafted rubber has a swell index in the range from 5 to 30; and wherein said grafted rubber has a G/R in the range from 0.1 to 0.9 and the amount of said lightly-grafted rubber is in the range from 10 to 90 weight percent, based on total rubber weight.

12. A blend composition in accordance with claim 11 wherein said molecular weight distribution is not greater than 1.8.

13. A blend composition in accordance with claim 1 wherein said anionically polymerized copolymer has a weight average molecular weight in the range from 50,000 to 500,000 and a molecular weight distribution not greater than 2.3; said ungrafted rubber and said grafted rubber each have a swell index in the range from 10 to 20; said grafted rubber has a G/R in the range from 0.1 to 0.5; and the amount of said grafted rubber is in the range from 10 to 50 weight percent, based on total rubber weight.

14. A blend composition in accordance with claim 1 wherein said anionically polymerized copolymer comprises a copolymer of styrene and alpha-methyl styrene.

15. A blend composition in accordance with claim 14 wherein said copolymer has a weight average molecular weight of at least 50,000 and a molecular weight distribution not greater than 2.3; and wherein each of said ungrafted rubber and said grafted rubber has a swell index in the range from 5 to 30, said grafted rubber has a G/R in the range from 0.1 to 0.9 and the amount of said grafted rubber is in the range from 10 to 90 weight percent, based on total rubber weight.

16. A blend composition in accordance with claim 15 wherein said molecular weight distribution is not greater than 1.8.

17. A blend composition in accordance with claim 16 wherein the amount of said matrix continuous phase is in the range from 60 to 99 weight percent and the amount of said elastomeric discontinuous phase is such that the composition has a rubber content in the range from 1 to 40 weight percent.

18. A blend composition in accordance with claim 16 wherein said elastomeric discontinuous phase comprises aggregates having particle sizes in the range from 3,000 to 100,000 angstroms.

19. A blend composition in accordance with claim 18 wherein the amount of said matrix continuous phase is in the range from 60 to 99 weight percent and the amount of said elastomeric phase is such that the composition has a rubber content in the range from 1 to 40 weight percent.

20. A blend composition in accordance with claim 1 wherein said anionically polymerized copolymer comprises from 20 to 70 weight percent of isopropenyl aromatic monomer, has a weight average molecular weight of at least 50,000 and a molecular weight distribution not greater than 2.3.

* * * * *

UNITED STATES PATENT AND TRADEMARK OFFICE
CERTIFICATE OF CORRECTION

PATENT NO. : 4,904,730

DATED : February 27, 1990

INVENTOR(S) : Egene R. Moore and Thomas D. Traugott

It is certified that error appears in the above-identified patent and that said Letters Patent is hereby corrected as shown below:

Column 3, line 64, "monome" should correctly appear as --monomer--.

Column 4, line 13, "s" should correctly appear as --so--.

Column 7, line 21, "resent" should correctly appear as --present--.

Column 7, line 27, "product" should correctly appear as --produce--.

Column 7, line 55, "o" should correctly appear as --or--.

Signed and Sealed this

Thirtieth Day of July, 1991

Attest:

HARRY F. MANBECK, JR.

*Attesting Officer*     *Commissioner of Patents and Trademarks*